United States Patent
Getz et al.

(10) Patent No.: US 7,047,756 B2
(45) Date of Patent: May 23, 2006

(54) METHOD FOR AUTOMATIC THERMAL CALIBRATION OF A COOLING SYSTEM

(75) Inventors: Robin Laurie Getz, Sherwood, OR (US); David Edward Hanrahan, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/366,713

(22) Filed: Feb. 14, 2003

(65) Prior Publication Data

US 2004/0040318 A1    Mar. 4, 2004

Related U.S. Application Data

(60) Provisional application No. 60/358,949, filed on Feb. 22, 2002.

(51) Int. Cl.
*F28F 7/00* (2006.01)
(52) U.S. Cl. .................... 62/259.2; 165/80.3
(58) Field of Classification Search ........... 165/239, 165/243, 244, 247, 80.3, 299; 236/35, 49.3, 236/78 D; 62/259.2, 186; 700/277, 278
See application file for complete search history.

(56) References Cited

U.S. PATENT DOCUMENTS

| | | | |
|---|---|---|---|
| 5,344,070 A | * | 9/1994 | Akasaka et al. ........... 236/49.3 |
| 5,372,015 A | * | 12/1994 | Suzuki et al. ............... 62/228.4 |
| 5,511,724 A | | 4/1996 | Freiberger et al. |
| 5,769,314 A | | 6/1998 | Drees et al. |
| 5,907,955 A | | 6/1999 | Park |
| 5,926,386 A | * | 7/1999 | Ott et al. .................... 700/278 |
| 6,220,518 B1 | | 4/2001 | Kline et al. |
| 6,488,213 B1 | * | 12/2002 | Ohga et al. ................ 236/49.3 |
| 2002/0020755 A1 | | 2/2002 | Matsushita |

* cited by examiner

*Primary Examiner*—Harry B. Tanner
(74) *Attorney, Agent, or Firm*—Marger Johnson & McCollom, P.C.

(57) ABSTRACT

This disclosure describes a method for operating a cooling device in a thermal system that is responsive to an operating parameter and dynamically changes the operating parameter to achieve a maximum operating temperature for any system regardless of the subsystem variation.

15 Claims, 6 Drawing Sheets

METHOD FOR AUTOMATIC THERMAL CALIBRATION OF A COOLING SYSTEM

CROSS REFERENCE TO RELATED APPLICATIONS

This application claims the benefit of priority under 35 USC § 119(e) to U.S. Provisional Application No. 60/358,949, filed on Feb. 22, 2002, whose contents are hereby incorporated by reference in their entirety for all purposes. This application is also related to U.S. Non-Provisional Application No. 10/366,726, filed on Feb. 14, 2003, entitled METHOD AND APPARATUS FOR RESPONDING TO A THERMAL THROTTLING SIGNAL, by the same inventors as the present application, and whose contents are hereby incorporated by reference in their entirety for all purposes.

BACKGROUND OF THE INVENTION

1. Technical Field of the Invention

This disclosure relates to automatic temperature control, and more particularly, to the dynamic adjustment of cooling devices in a personal computer (PC).

2. Description of the Related Art

In order to effectively control system temperatures, the ability to accurately measure both processor and system temperatures is required. In any PC central processing unit (CPU), the most relevant temperature is that of the "hot spot" on the die. All other temperatures in the system (including the heat-sink temperature) will follow the die temperature. A popular technique presently used to measure the die temperature is known as TDM (Thermal Diode Monitoring). In TDM, two different currents are successively passed through a diode-connected transistor, and the change in voltage can then be used to calculate the temperature. Most processors manufactured since the Intel Pentium II typically possess a strategically located transistor on its die used expressly for TDM.

With an accurate temperature monitoring method in place, the cooling devices employed in a PC (typically fans), can be controlled effectively. A variety of methods to control fan speeds exist. Two-step control is the simplest and consists of the fan either being off or on. Three-step control adds an additional half-speed step to what is otherwise two-speed operation. Linear fan speed control varies the speed of the fan by applying different voltages depending on the measured temperature. With PWM (pulse width modulation) control, the speed of the cooling fan is adjusted by applying a maximum voltage for different intervals—typically the duty cycle of a square wave at 30 Hz to 100 Hz. As the duty cycle, or ratio of high time to low time, changes so will the speed of the fan.

All of the methods for fan speed control mentioned above may use the CPU to read the temperature from the TDM device over a system bus. The thermal management software executed by the CPU must decide the appropriate fan speed and write a value to a register on the system's monitor integrated circuit (IC) to set the desired fan speed.

An automatic fan speed control loop can implement any of the fan speed control methods above. Automatic fan speed control loops are preferred because they can run independently of software. Once a system's monitoring device has been initialized by loading limit registers wit required parameters, the IC can react to temperature changes without host intervention. Fan speeds may also be optimized at any given temperature with an automatic fan speed control loop, equating to a reduction both in acoustic noise and power consumption, both of which are critical in notebook PC applications.

FIG. 1 is a plot of fan duty cycle as a function of temperature and illustrates a prior art methodology for an automatic fan speed control loop for a PC that utilizes PWM. During the power on self-test of the platform, software programs the temperature $T_{MIN}$ at which the fan turns on, the minimum fan duty cycle $D_{MIN}$, the temperature range $T_{RANGE}$, and any temperature hysteresis $T_{HYS}$, if desired. The solid line of FIG. 1 depicts how the fan duty cycle reacts to increasing or decreasing temperatures. From a cool state, as the temperature increases as shown by arrows 10 and approaches $T_{MIN}$, the fan remains off. Once the temperature reaches $T_{MIN}$, the fan will turn on to the minimum fan duty cycle $D_{MIN}$. As the temperature increases, the fan speed will also increase as shown by arrows 12 until it has reached 100% at $T_{MIN}+T_{RANGE}$. As the temperature decreases, the fan speed will decrease as shown by arrows 14 until the temperature reaches $T_{MIN}$. In order that the fan not continually cycle on and off, the fan will continue to run at the minimum speed as shown by arrows 16 until the temperature falls below the hysteresis point $T_{HYS}$, where it will turn off, and wait until the temperature rises again. If the system designer does not want the fan to turn off at the hysteresis point, it is alternately possible for the fan to run at the minimum operating point continually.

The process used to determine the operating points of $T_{MIN}$, $T_{RANGE}$, and $D_{MIN}$ in the methodology described above is to experimentally build a worst case model or system. From that worst case model the operating points are determined. Ideally, these control loop parameters are selected so that the system is calibrated to operate near its maximum operating temperature, but without exceeding the maximum operating temperature.

In any given system such as a PC, however, a specific unit has thermal characteristics that are completely unique. The variability in heat generated by subsystems (hard drives, optical drives, RAM, CPU, Memory, Graphics, Audio, Power Supply, connected peripherals, etc) will never be the same in similar builds of systems. This effect is compounded because heat-removing subsystems are also never exactly the same. For example, fans of the same model can vary in speed even though the same voltage is applied. In fact, RPM tolerances for fans are typically about +/−20%. The effectiveness of the fan cooling system is also dependent upon the altitude where the PC is operated; fans are more efficient at sea level then they are at altitude. The end user may also inadvertently alter the system cooling solution by placing the PC against a wall, blocking the air ducts. Further complications arise because of assembly variations—cables blocking airflow, heat sink grease thickness variations, heat sink pressure variations, etc. The CPU power consumption figure shown on the datasheets is also a maximum figure that does not necessarily reflect the true operating conditions. Thus, it is impossible to determine a thermal profile for a system or build a model that is typical of all systems.

Subsystem manufacturers are often responsible for determining these operating points. When they do not have control of the entire system, it makes their job nearly impossible. There is no effective way to determine the actual operating points in a system before that particular system is completely assembled. As a result, system designers are forced to design around worst case conditions, conditions where the actual system is almost never operated. This results in overcooling of the CPU and excessive acoustic noise.

What is needed is a method for an automatic cooling device control loop that can dynamically change operating parameters to adjust for the varying thermal conditions contributed by all system sub-components.

DETAILED DESCRIPTION OF THE INVENTION

Figure 1:
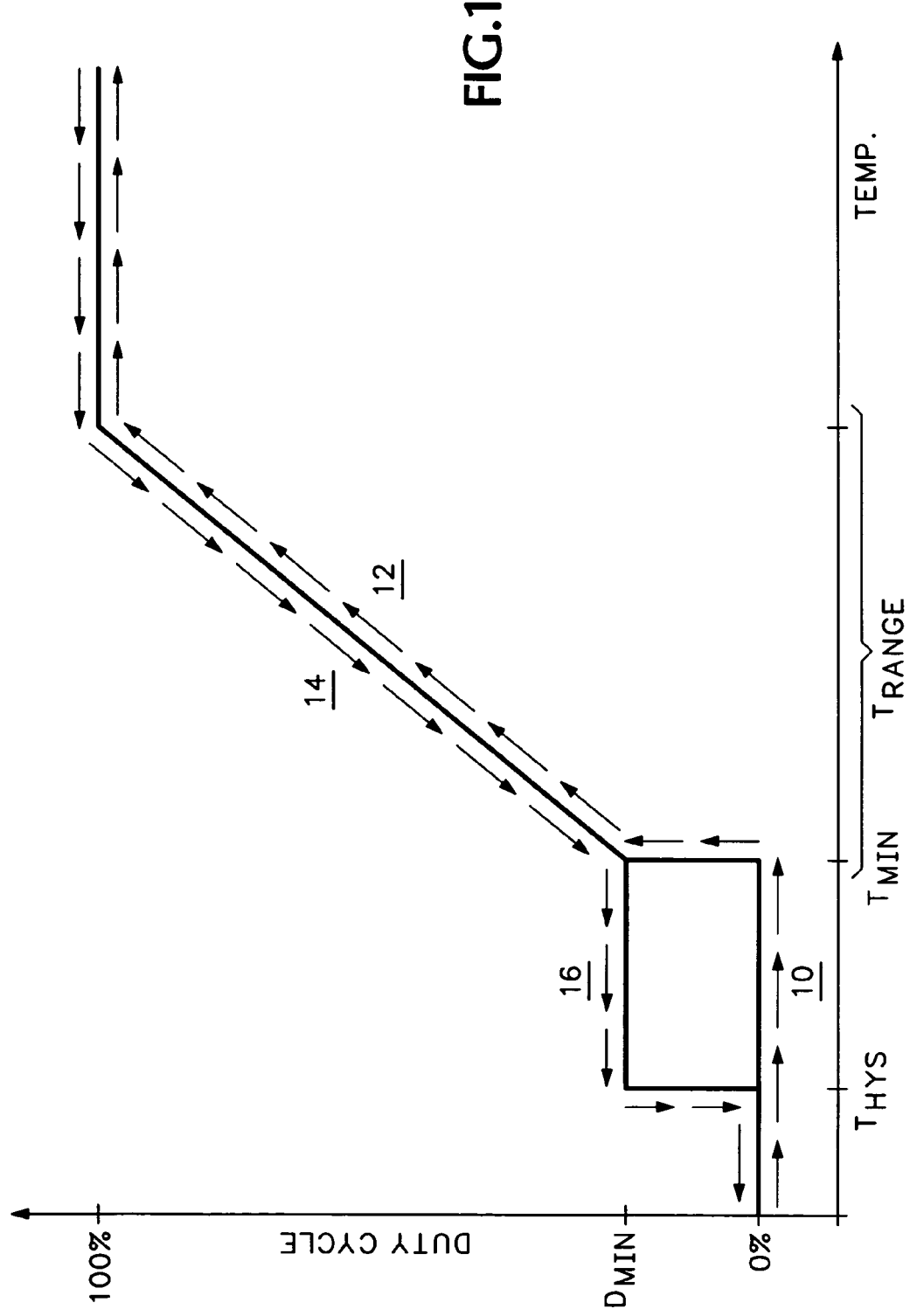
FIG. 1 is a plot of fan duty cycle as a function of temperature illustrating a conventional methodology for an automatic fan speed control loop for a PC.
Figure 2:
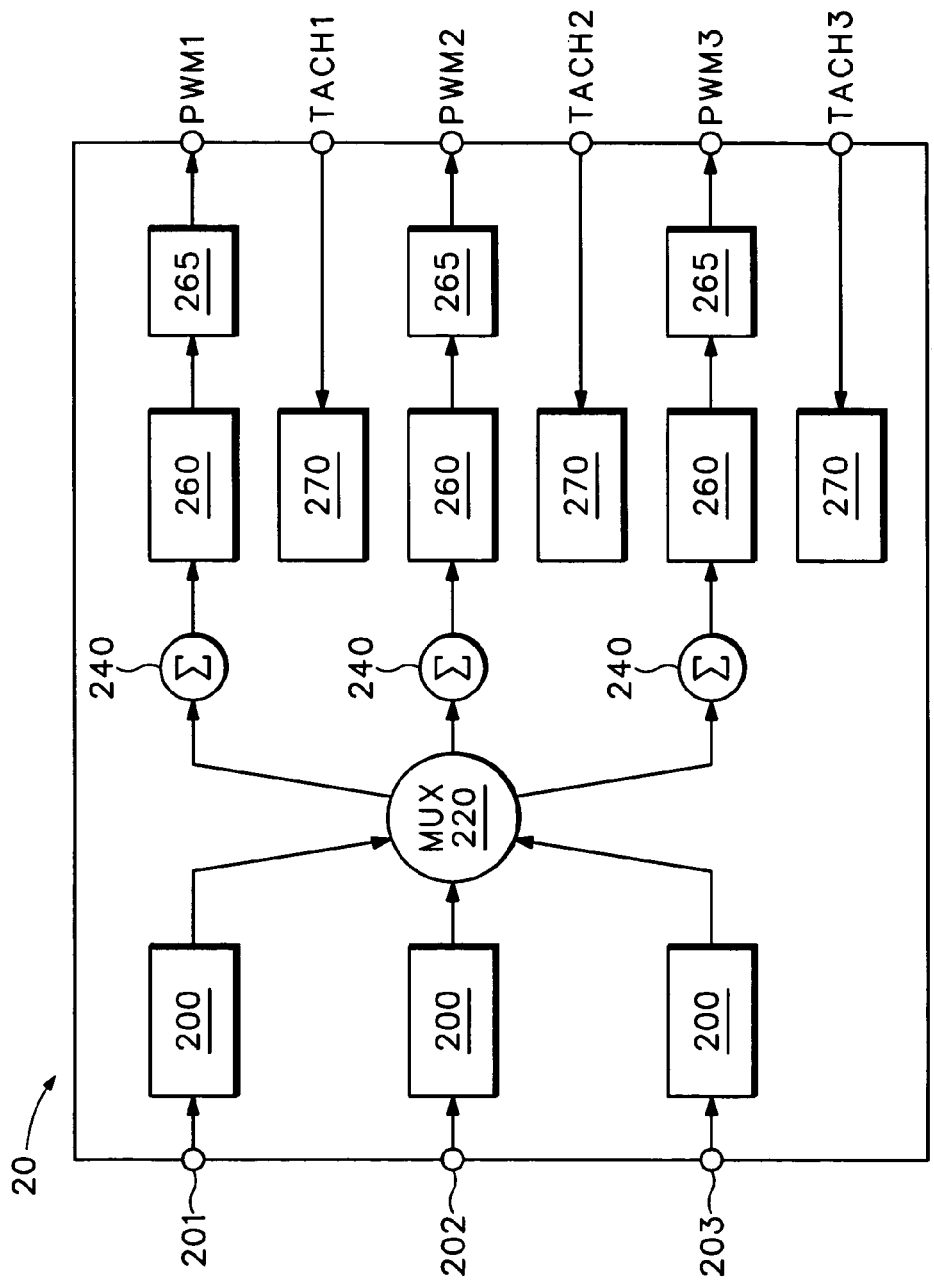
FIG. 2 is a top-level overview of automatic fan control circuitry in accordance with an embodiment of the invention.

FIG. 2 is a top-level overview of automatic fan control circuitry 20 in accordance with an embodiment of the invention. From a systems-level perspective, this embodiment allows up to three system temperatures to be input on three temperature channels (remote channel 201, local channel 202, remote channel 203) to be monitored and used to control three pulse-width modulated outputs PWM1, PWM2, PWM3. The pulse-width modulated outputs PWM1, PWM2, PWM3 controls the speed of up to four cooling devices (typically fans), assuming that two of the four devices are attached in parallel. The embodiment can also monitor the speed of the fans using the inputs TACH1, TACH2, TACH3 and tachometer measurement blocks 270.

The remote temperature channels 201 and 203 are implemented with a remote sensing diode (not shown) that may be located a distance from the automatic fan control circuitry. The local temperature channel 202 is implemented with a sensing diode (not shown) contained within the automatic fan control circuitry 20. Thus, each of the three temperature channels may monitor the temperature from a different region of the system. For example, in this embodiment there may be one remote sensing diode for remote temperature channel 201 located within the chassis but separated apart from heat generating sub-components in order to measure the ambient temperature. Another remote sensing diode for the remote temperature channel 203 may actually be the processor's own thermal diode. The automatic fan control circuitry 20 may be located close to another heat source, such as the voltage supply.

Each temperature channel has a thermal calibration block 200, allowing the designer to individually configure the temperature characteristics of each temperature channel 201–203. For example, if remote channel 201 were configured to monitor a CPU temperature, and local channel 202 to monitor the ambient temperature, the two channels may be calibrated to activate the associated fans when the temperature exceeds 60° C. and 45° C., respectively. Thus, the calibration process for each temperature channel 201–203 sets the $T_{MIN}$ for each channel.

MUX 220 is used to assign any of the three thermally calibrated channels to one of the three pulse-width modulated outputs PWM1, PWM2, PWM3. The modulation control blocks 240 allow the designer to control the minimum pulse-width modulation duty cycle, while graceful fan speed changes that are less perceptible to the user may be achieved using the ramp control blocks 260. The actual outputs PWM1, PWM2, PWM3 are generated in the PWM generators 265.

Figure 3:
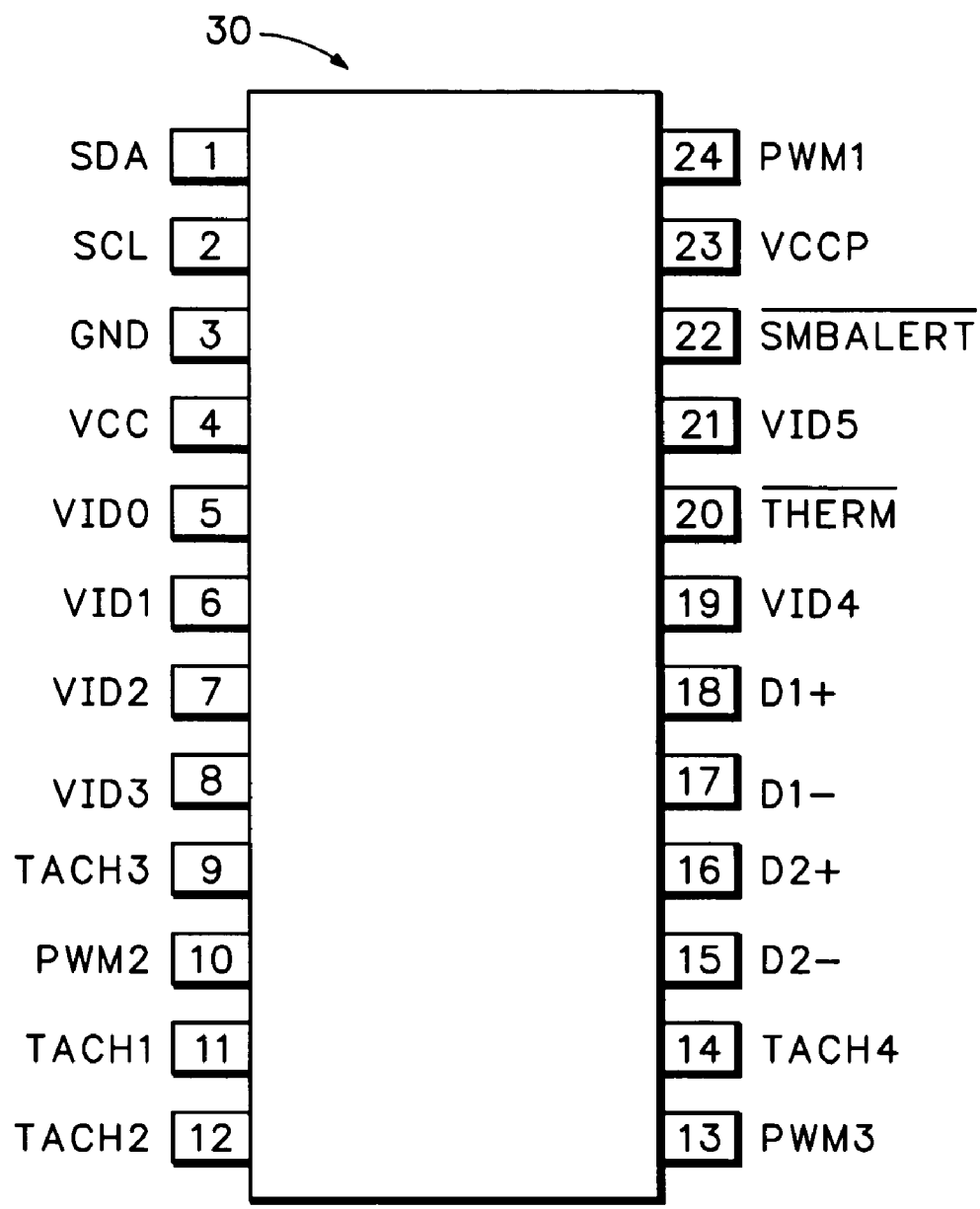
FIG. 3 is a schematic view of a 24-pin ASIC package in accordance with an embodiment of the invention.

FIG. 3 is a schematic view of a 24-pin ASIC package 30 in accordance with an embodiment of the invention. Pin 1 (SDA) is for SMBus bidirectional serial data. Pin 2 (SCL) is for SMBus serial clock input. Pin 3 (GND) is the ground pin. Pin 4 (Vcc) is the power supply pin, which in this embodiment can be +5 V or +3.3 V. Pins 5–8 (VID0–VID3) are digital inputs for voltage supply readouts from the CPU. Pin 9 (TACH3) is a fan tachometer input for measuring the speed of a third attached fan (not shown). Pin 10 (PWM2) is a pulse width modulated output to control a second attached fan (not shown). Pins 11 and 12 (TACH1 and TACH2) are fan tachometer inputs for measuring the speed of a first attached fan (not shown) and the second attached fan, respectively.

Pin 13 (PWM3) is a pulse width modulated output to control the third attached fan. Pin 14 (TACH4) is a fan tachometer input for measuring the speed of a fourth attached fan (not shown). Pin 15 (D2−) is the cathode connection for temperature measurement of a second thermal diode (not shown). Pin 16 (D2+) is the anode connection for temperature measurement of the second thermal diode. Pin 17 (D1−) is the cathode connection for temperature measurement of a first thermal diode (not shown). Pin 18 (D1+) is the anode connection for temperature measurement of the first thermal diode. Pin 19 (VID4) is a fourth digital input for a voltage-supply readout from the CPU. The first and second thermal diodes connected to pins 15, 16 and 17, 18 respectively, implement remote temperature channels similar to those discussed for FIG. 2.

Pin 20, THERM, is a bidirectional pin. THERM is connected to a thermal throttling signal such as Intel's Pentium 4 PROCHOT output. THERM may also be used as an output to signal over-temperature conditions or for clock modulation purposes. Pin 21 (VID5) is a fifth digital input for a voltage supply readout from the CPU. Pin 22 (SMBALERT) is a digital output that is used to signal thermal limit conditions. Pin 23 (Vccp) is an analog input that monitors the processor core voltage. Pin 24 (PWM1) is a digital pulse width modulated output for speed control of the first attached fan.

In co-pending U.S. Non-Provisional Application No. 10/366,726, filed on Feb. 14, 2003, described above, a detailed explanation appears explaining how this and other embodiments of the invention may also monitor thermal throttling signals, such as the PROCHOT signal from the Intel Pentium 4 processor, in a useful way. This embodiment, through asserting the SMBALERT pin, may generate system interrupt signals when thermal limit conditions have been reached.

In other embodiments of the invention, there may be a different number of pins associated with the ASIC package 30 or the pins may be reconfigurable to perform different functions. In other words, the number of pins or the physical layout of the pins is not limiting in any way. Furthermore, the invention is not strictly limited only to an ASIC package 30 as illustrated in FIG. 3.

Embodiments of the invention dynamically reconfigure an operating parameter for a cooling device. For example, an automatic fan speed control loop according to an embodiment of the invention can initially set a low $T_{MIN}$ and slowly increase it, until a temperature limit is exceeded or an external event occurs. Conversely, the automatic fan speed control loop can also stop increasing $T_{MIN}$ and/or decrease it if the thermal limit is exceeded or if a thermal occurs.

Figure 4:
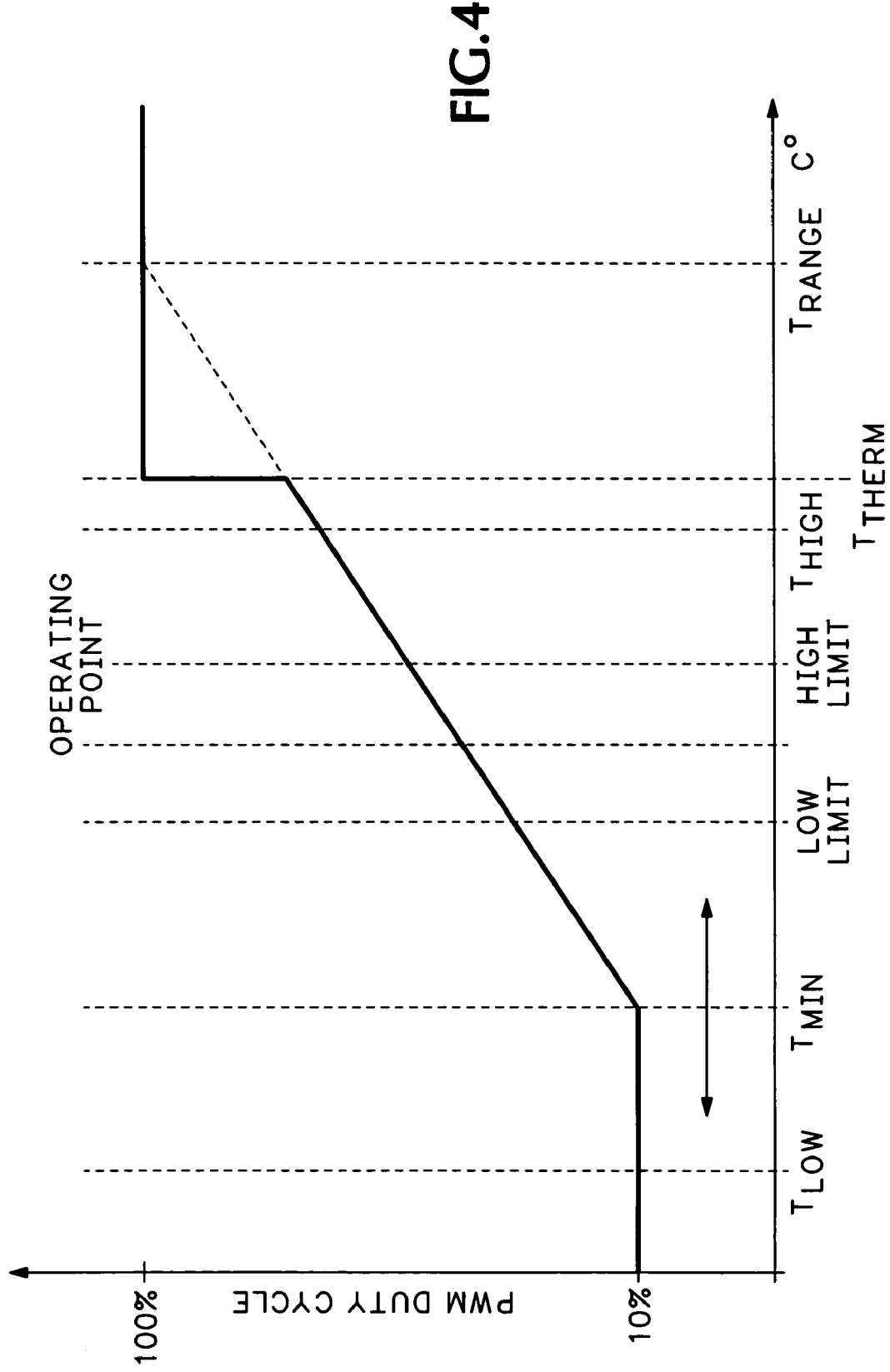
FIG. 4 is a plot illustrating the PWM duty cycle as a function of temperature, along with some important parameters.

FIG. 4 is a plot of PWM duty cycle as a function of temperature illustrating some important parameters that are used by embodiments of the invention. The outputs PWM1, PWM2, and PWM3 of FIG. 2 follow paths similar to the solid line illustrated in FIG. 4. Some of the relevant parameters that affect the operation of the embodiment include $T_{LOW}$, $T_{MIN}$, Low Limit, Operating Point, High Limit, $T_{HIGH}$, $T_{THERM}$, and $T_{RANGE}$. Each of the temperature channels, such as the remote channel 201, local channel 202, and remote channel 203 in FIG. 2, has its own parameters. These parameters are initially set by the system designer in registers that are a part of the automatic fan control circuitry. In this embodiment of the invention, the Low Limit, Operating Point, and High Limit registers are 8-bit registers, which allows 1° C. resolution. This embodiment of the invention dynamically alters the initially-set parameter $T_{MIN}$ to maintain each temperature zone as close as possible to the target Operating Point.

If the temperature falls below the $T_{LOW}$ limit, an error flag may be set in a status register, and a system interrupt may be asserted. For example, the SMBALERT pin of FIG. 3 may be asserted. $T_{MIN}$, as explained previously, is the temperature at which a pulse-width modulated output begins to increase above the minimum preset level, turning on the attached fan. Here, the 10% minimum duty cycle is an arbitray value. The Operating Point is the temperature defining the target temperature or optimal "operating point" for each particular temperature zone. If the temperature rises above a $T_{HIGH}$ limit, an error flag may be set in a status register, and a system interrupt may be asserted. For example, the SMBALERT pin of FIG. 3 may be asserted. $T_{THERM}$ is the critical limit where the pulse-width modulated output achieves 100%, achieving maximum cooling with the continuous operation of the fan. $T_{RANGE}$ is the temperature that is used to control the slope of the PWM duty cycle vs. temperature characteristic.

As was explained, the Operating Point for each temperature channel is the optimal temperature channel for that thermal zone. The hotter each zone is allowed to be, the quieter the entire system becomes because the fans are not required to run 100% all of the time. This embodiment of the invention will increase or decrease the fan speed as necessary to maintain each temperature zone at the Operating Point. This allows for system-to-system variation and removes the need for worst case design. As long as a sensible Operating Point value is chosen, any $T_{MIN}$ value can be selected by the system designer in the initial system characterization. If the $T_{MIN}$ value is too low, the fans will begin to run sooner than required, and the temperature will be below the Operating Point. In response to this situation, the embodiment will increase the $T_{MIN}$ value to keep the fan off for a longer period of time, allowing the temperature in the temperature zone to get closer to the operating point.

Two parameters that have not been discussed yet are Low Limit and High Limit. Low Limit defines the temperature at which the $T_{MIN}$ value will start to be increased, if the temperature falls below this value. As will be explained in further detail below, this has the net effect of reducing the fan speed allowing the system to get hotter. Similarly, High Limit defines the temperature at which the $T_{MIN}$ value will start to be reduced, if the temperature increases above this value. As will be explained in further detail below, this has the net effect of increasing the fan speed and cooling the temperature down. Interrupts may be generated if the measured temperature falls below the Low Limit or rises above the High Limit. Thus, Low Limit and High Limit allow the system designer to specify a "safe" range on either side of the Operating Point where the $T_{MIN}$ value will not be adjusted.

Embodiments of the invention may increase the $T_{MIN}$ value or decrease the $T_{MIN}$ value once during every pre-selected time period. The pre-selected time period for increasing the $T_{MIN}$ value may be different than the pre-selected time period for decreasing the $T_{MIN}$ value.

Conversely, an initial $T_{MIN}$ value may be set too high. In that case, the operating point will be exceeded, and in turn, the embodiment will reduce the $T_{MIN}$ value to turn the fan on earlier and cool the system.

Figure 5:
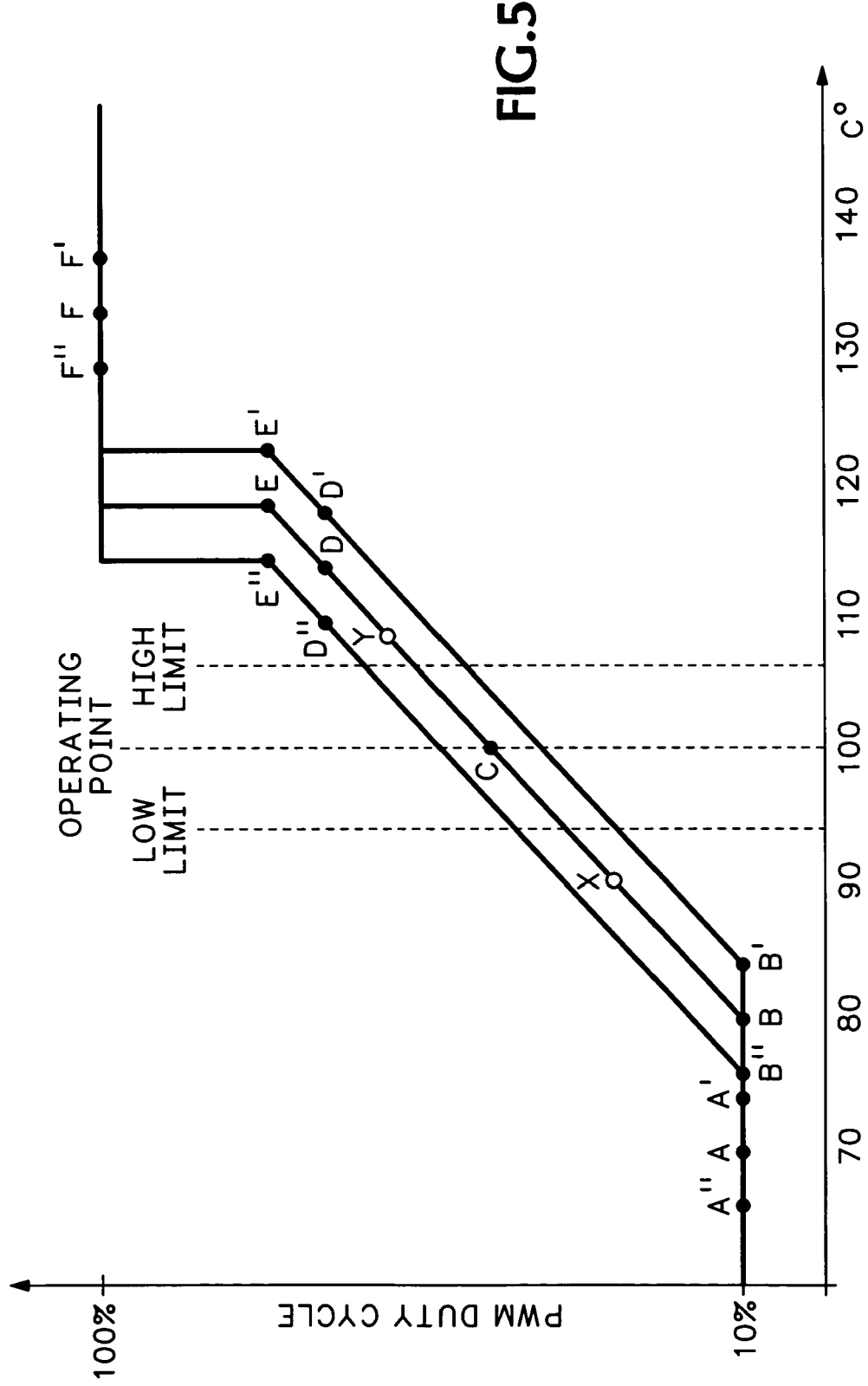
FIG. 5 is a plot illustrating an example of how the PWM duty cycle is dynamically shifted according to an embodiment of the invention.

For a specific example, FIG. 5 illustrates how the PWM duty cycle is dynamically shifted by an embodiment of the invention. Points A, B, C, D, and E correspond to the temperatures $T_{LOW}$, $T_{MIN}$, Operating Point, $T_{HIGH}$, $T_{THERM}$, and $T_{RANGE}$, respectively, as set by the system designer in the registers that are included as part of the automatic fan control circuit. At some point in time the actual temperature of the temperature zone is at point X. This indicates that the initial $T_{MIN}$ value was set too low, causing the attached fan to turn on too soon and overcool the temperature zone.

According to this embodiment, $T_{MIN}$ is increased by 1° C. every 60 seconds, shifting the entire PWM Duty Cycle function to the right. Thus, after one minute, $T_{MIN}$ is at 81° C., after two minutes, at 82° C., etc. The new location for the parameters $T_{LOW}$, $T_{MIN}$, $T_{HIGH}$, $T_{THERM}$, and $T_{RANGE}$, are represented by the points A', B', D', E', and F', respectively. For a given temperature at one instant in time, as the PWM Duty Cycle function is shifted to the right, the PWM Duty Cycle slowly decreases. This reduces the fan speed, and, in turn, causes the temperature to rise closer to the Operating Point, which is still at 90° C. The PWM Duty Cycle continues to decrease as the $T_{MIN}$ increases until one of two things happen. Either $T_{MIN}$ reaches a maximum pre-selected value, or the fan slows down so much that the operating temperature reaches a maximum safe operating point. The point where the maximum safe operating point is achieved can be determined by reaching an operating temperature threshold or by some external event. In this way the operating temperature is determined in situ, and $T_{MIN}$ is dynamically shifted upward.

If the operating temperature remains above the maximum safe operating point or the external event continues to occur, in this embodiment of the invention $T_{MIN}$ decreases every pre-selected time period. In this embodiment, the pre-selected time period is 0.5 seconds, but other embodiments preferably have time period duration between 500 ms and one second.

Decreasing $T_{MIN}$ causes the entire PWM Duty Cycle function to shift to the left in FIG. 5. This shift increases the fan duty cycle, and in turn, the cooling effect. Cooling continues until the operating temperature decreases below the thermal limit or the external event ceases to occur. In another possible embodiment of the invention, once the maximum temperature has been reached, the $T_{MIN}$ setting will never increase.

In the embodiment explained above with reference to FIG. 5, the situation where $T_{MIN}$ was initially set too low was discussed. However, in the case where $T_{MIN}$ is set too high during power on self-test, a situation would arise where the actual operating temperature (point Y) is above the selected Operation Point (point C). In this event, the embodiment of the invention can also decrease $T_{MIN}$ to ensure that the operating temperature does not exceed the maximum safe operating point. The shifting of the operating parameters is conducted the same way in both cases. In FIG. 5, the new locations corresponding to the parameters $T_{LOW}$, $T_{MIN}$, $T_{HIGH}$, $T_{THERM}$, and $T_{RANGE}$, are represented by the points A", B", D", E", and F"', respectively.

Figures 6, 7:
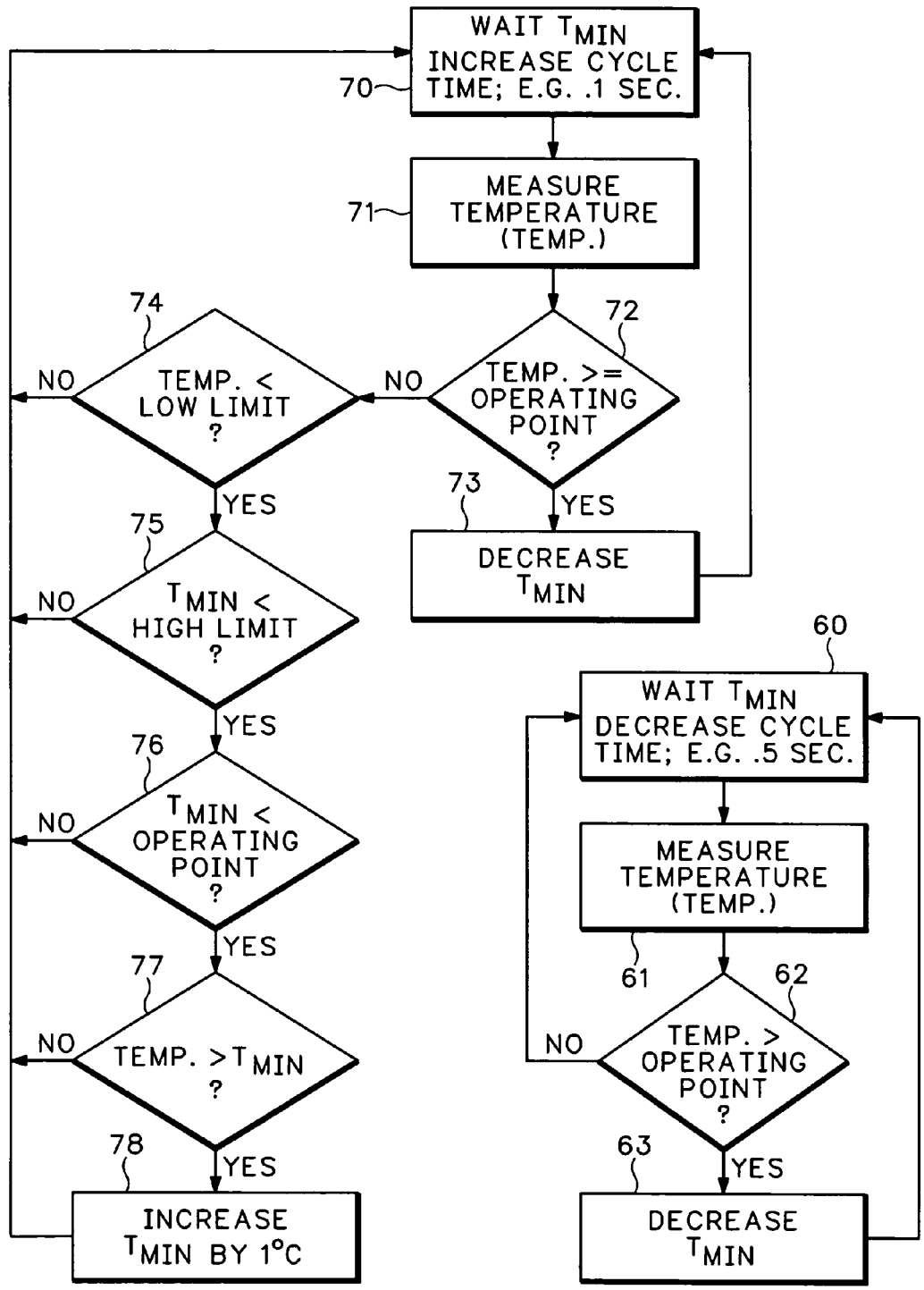
FIG. 6 is a flow chart illustrating some of the processes used by an embodiment of the invention when adjusting the operating parameter $T_{MIN}$ downward.
FIG. 7 is a flow chart illustrating some of the processes used by an embodiment of the invention when adjusting the operating parameter $T_{MIN}$ upward.

FIG. 6 is a flow chart illustrating some of the processes followed by an embodiment of the invention when adjusting the operating parameter $T_{MIN}$ downward. In process 60, the embodiment waits a pre-determined duration of 0.5 seconds. In process 61, the embodiment measures the temperature (Temp) supplied on the temperature channel (such as remote channel 201 of FIG. 2). Process 62 compares the measured temperature Temp with the value in the Operating Point register, and based on the outcome of that comparison will decrease $T_{MIN}$ in process 63 before returning to process 60 to wait for another cycle time.

FIG. 7 is a flow chart illustrating some of the processes followed by an embodiment of the invention when adjusting the operating parameter $T_{MIN}$ upward. At process 70, one predetermined cycle time passes (here, 1 sec.) before the temperature (Temp) supplied on the temperature channel (such as remote channel 201 of FIG. 2) is measured at process 71. The measured temperature Temp is compared to the value in the Operating Point register, and if Temp is greater or equal to the Operating point, $T_{MIN}$ is decreased in process 73 before returning to process 70. Otherwise, with Temp less than the Operating Point, a series of comparisons are made in processes 74–77. In order for $T_{MIN}$ to be increased in process 78, Temp must be less than the Lower Limit (process 74), $T_{MIN}$ must be less than both the High Limit (process 75) and the Operating Point (process 76), and Temp must be greater than $T_{MIN}$ (process 77).

Thus, embodiments of the invention can dynamically increase $T_{MIN}$ to slow down the fans at the same temperature (in the case of over-cooling), or dynamically decrease $T_{MIN}$ to speed the fans up at the same temperature (in the case of under-cooling).

In embodiments of the invention, the maximum safe operating point can be programmed into the device at power on, or an external event can trigger this action. For example, when embodiments of the invention are used in conjunction with the Intel Pentium™ 4 processor, activation of the processor's Thermal Control Circuit may set the operating point.

Alternatively, other embodiments of the invention can dynamically change other operating parameters. For example, the slope of the characteristic curve for the automatic fan speed control loop may be changed by dynamically changing the $T_{RANGE}$ parameter.

One of the advantages of embodiments of the invention is that operating points are determined in situ, thereby eliminating the part-to-part and subsystem-to-subsystem variation described above in the description of the related art.

Having described and illustrated the principles of the invention, it should be apparent that the invention can be modified in arrangement and detail without departing from such principles. Accordingly, all such changes and modifications are considered to fall within the scope of the following claims.

The invention claimed is:

1. A method comprising:
   operating a cooling device in a personal computer system responsive to a characteristic curve, the characteristic curve defining an operating parameter of the cooling device as a function of a temperature of the personal computer system; and
   dynamically changing the characteristic curve in response to changes in the temperature of the personal computer system.

2. A method according to claim 1 wherein:
   the characteristic curve comprises a minimum temperature and a slope;
   operating the cooling device in a personal computer responsive to the characteristic curve comprises operating a fan responsive to the minimum temperature and the slope; and
   dynamically changing the characteristic curve comprises shifting the characteristic curve responsive to the temperature of the personal computer system.

3. A method according to claim 2 wherein operating the fan responsive to the minimum temperature and slope comprises:
   leaving the fan off when the temperature of the personal computer system is below the minimum temperature; and
   turning the fan on when the temperature of the personal computer system reaches the minimum temperature.

4. A method according to claim 2 wherein shifting the characteristic curve responsive to the temperature of the personal computer system comprises:
   setting the minimum temperature to a low value; and
   gradually increasing the minimum temperature.

5. A method according to claim 4 wherein gradually increasing the minimum temperature comprises increasing the minimum temperature until the temperature of the personal computer system reaches a limit.

6. A method according to claim 4 wherein gradually increasing the minimum temperature comprises increasing the minimum temperature until an external event occurs.

7. A method according to claim 4 further comprising decreasing the minimum temperature if the minimum temperature becomes too high.

8. A method according to claim 1 wherein:
   the characteristic curve comprises a minimum temperature and a slope;
   operating the cooling device in a personal computer responsive to the characteristic curve comprises operating a fan responsive to the minimum temperature and the slope; and
   dynamically changing the characteristic curve comprises changing the slope responsive to the temperature of the personal computer system.

9. A thermal management system for a personal computer system comprising:
   a cooling device; and
   a controller coupled to the cooling device, the controller configured to operate the cooling device responsive to a characteristic curve, the characteristic curve defining an operating parameter of the cooling device as a function of a temperature of the personal computer system, the controller further configured to dynamically change the characteristic curve in response to changes in the temperature of the personal computer system.

10. The thermal management system of claim 9, wherein the operating parameter comprises a duty cycle of the cooling device.

11. The thermal management system of claim 9, wherein the cooling device comprises a fan and the operating parameter comprises a speed of the fan.

12. A method comprising:
   operating a cooling device in a personal computer in accordance with a control loop having a characteristic curve, the characteristic curve defining an operating parameter of the cooling device as a function of a temperature of the personal computer; and
   dynamically changing the characteristic curve in response to changes in the temperature of the personal computer.

13. A method according to claim 12 wherein the characteristic curve comprises a minimum temperature and a slope.

14. A method according to claim 13 wherein the slope is the slope of a curve for the control loop.

15. An integrated circuit comprising circuitry configured to:
   operate a cooling device in a personal computer responsive to a characteristic curve, the characteristic curve defining an operating parameter of the cooling device as a function of a temperature of the personal computer; and
   dynamically changing the characteristic curve in response to changes in the temperature of the personal computer.

* * * * *